(12) United States Patent
Swoboda

(10) Patent No.: US 6,836,757 B1
(45) Date of Patent: Dec. 28, 2004

(54) EMULATION SYSTEM EMPLOYING SERIAL TEST PORT AND ALTERNATIVE DATA TRANSFER PROTOCOL

(75) Inventor: Gary L. Swoboda, Sugarland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/483,321

(22) Filed: Jan. 14, 2000

Related U.S. Application Data

(60) Provisional application No. 60/120,667, filed on Feb. 19, 1999.

(51) Int. Cl.[7] ............................................. G06F 9/455
(52) U.S. Cl. ............................ 703/25; 703/23; 703/24; 703/28; 714/724; 370/510
(58) Field of Search ............................. 703/25, 23, 24, 703/28; 714/724; 370/510

(56) References Cited

U.S. PATENT DOCUMENTS

| | | | |
|---|---|---|---|
| 5,530,704 A | * | 6/1996 | Gibbons et al. ............ 370/510 |
| 5,828,824 A | * | 10/1998 | Swoboda ...................... 714/25 |
| 6,037,868 A | * | 3/2000 | Oh et al. ................ 340/539.24 |
| 6,378,090 B1 | * | 4/2002 | Bhattacharya ................ 712/38 |
| 6,446,230 B1 | * | 9/2002 | Chung ........................ 714/726 |

OTHER PUBLICATIONS

Landis, D.L; Singh, P., "Optimal placement of IEEE 1149.1 test port and boundary scan resources for wafer scale integration," Proceedings of the International Test Conference, 1990 pp.: 120–126.*

Fitch, K.D.; Kane, J., "Application of boundary–scan and full–chip BIST to a 3 ASIC chip set," Proceedings of the IEEE 1991 Custom Integrated Circuits Conference, 1991, pp.: 17.5/1–17.5/4.*

Andrews, J., "An embedded JTAG, system test architecture," Electro/94 International Conference Proceedings. Combined Volumes, 199, pp.: 691–695.*

* cited by examiner

Primary Examiner—Jean R. Homere
Assistant Examiner—Herng-der Day
(74) Attorney, Agent, or Firm—Robert D. Marshall, Jr.; W. James Brady, III; Frederick J. Telecky, Jr.

(57) ABSTRACT

Emulation communications via a test access port and boundary-scan architecture providing serial access to a serial connection of a plurality of registers disposed in a plurality of modules. One of the modules is selected for communication. Nonselected modules are made nonresponsive to data on the serial connection. The external emulation hardware supplies a serial signal having a first logic state for a number of cycles greater in number than a number of bits of the serial connection of registers to the test access port. The emulation hardware supplies a start bit having an opposite logic state. The selected module detects the start bit and stores the next predetermined number of data bits. These bits could be data bits to be stored in a program visible data register or bits interpreted as an instruction for execution by the module. The selected module may transmit return communications via the serial scan path using the same format.

12 Claims, 3 Drawing Sheets

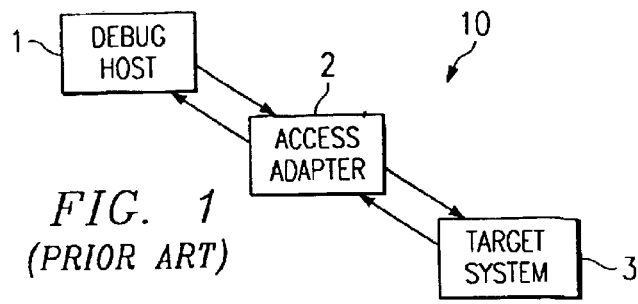
*FIG. 1*
*(PRIOR ART)*
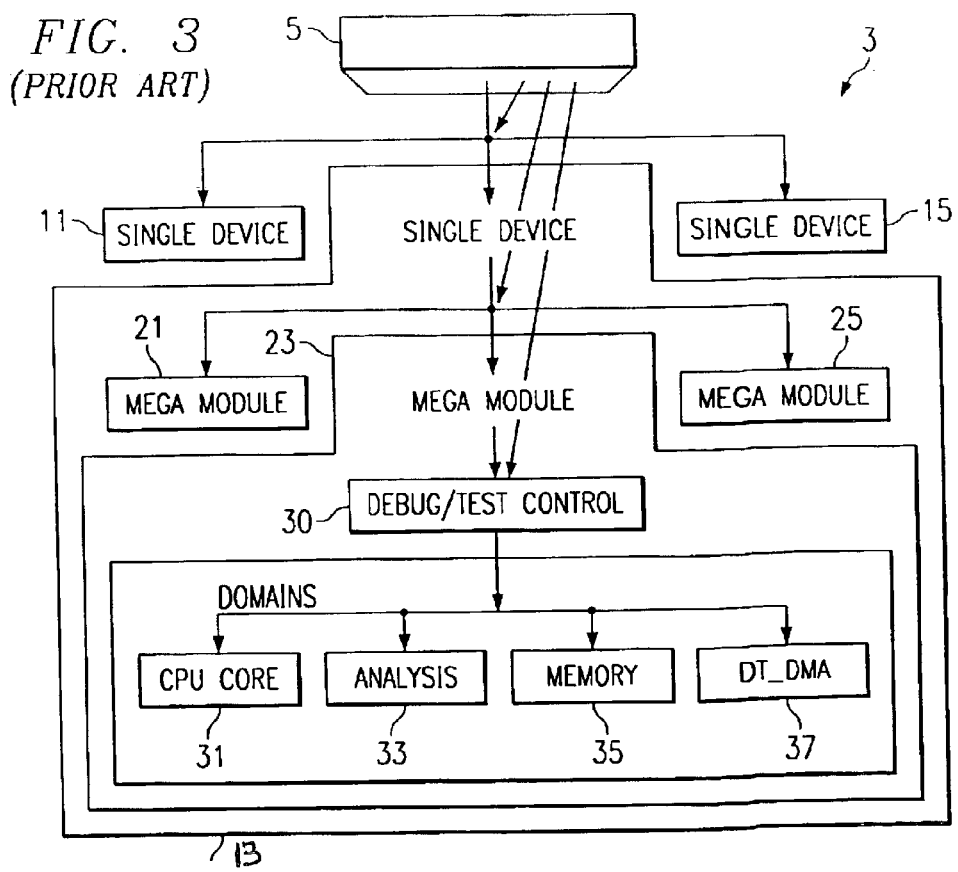

EMULATION SYSTEM EMPLOYING SERIAL TEST PORT AND ALTERNATIVE DATA TRANSFER PROTOCOL

This application is related to co-assigned applications all of which are incorporated herein by reference:

Ser. No. 09/154,385 entitled "METHOD OF INITIALIZING A CPU CORE FOR EMULATION" filed Sep. 16, 1998, now U.S. Pat. No. 6,167,385 issued Dec. 26, 2000; and the following contemporaneously filed applications:

Ser. No. 09/483,367, entitled "EMULATION SUSPEND MODE WITH DIFFERING RESPONSE TO DIFFERING CLASSES OF INTERRUPTS" claiming priority from U.S. Provisional Application No. 60/120,809 filed Feb. 19, 1999, now U.S. Pat. No. 6,553,513;

Ser. No. 09/481,852, entitled "EMULATION SUSPENSION MODE WITH STOP MODE EXTENSION" claiming priority from U.S. Provisional Application No. 60/120,809 filed Feb. 19, 1999, now U.S. Pat. No. 6,567,933;

Ser. No. 09/483,568, entitled "EMULATION SUSPEND MODE HANDLING MULTIPLE STOPS AND STARTS" claiming priority from U.S. Provisional Application No. 60/120,809 filed Feb. 19, 1999, now U.S. Pat. No. 6,564,339;

Ser. No. 09/483,697, entitled "EMULATION SUSPEND MODE WITH FRAME CONTROLLED RESOURCE ACCESS." claiming priority from U.S. Provisional Application No. 60/120,809 filed Feb. 19, 1999, now U.S. Pat. No. 6,557,116;

Ser. No. 09/482,902, entitled "EMULATION SUSPEND MODE WITH INSTRUCTION JAMMING" claiming priority from U.S. Provisional Application No. 60/120,809 filed Feb. 19, 1999, now U.S. Pat. No. 6,643,803;

Ser. No. 09/483,570, entitled "SOFTWARE EMULATION MONITOR EMPLOYED WITH HARDWARE SUSPEND MODE" claiming priority from U.S. Provisional Application No. 60/120,683 filed Feb. 19, 1999, Ser. No. 09/483,237, entitled "EMULATION SYSTEM WITH SEARCH AND IDENTIFICATION OF OPTIONAL EMULATION PERIPHERALS" claiming priority from U.S. Provisional Application No. 60/120,960 filed Feb. 19, 1999, now U.S. Pat. No. 6,671,665

Ser. No. 09/483,783, entitled "EMULATION SYSTEM WITH ADDRESS COMPARISON UNIT AND DATA COMPARISON UNIT OWNERSHIP ARBITRATION" claiming priority from U.S. Provisional Application No. 60/120,791 filed Feb. 19, 1999, now U.S. Pat. No. 6,606,590; and Ser. No. 09/481,853, entitled "EMULATION SYSTEM WITH PERIPHERALS RECORDING EMULATION FRAME WHEN STOP GENERATED" claiming priority from U.S. Provisional Application No. 60/120,810 filed Feb. 19, 1999.

This application claims priority under 35 USC §119(e)(1) of Provisional Application No. 60/120,667, filed Feb. 19, 1999.

TECHNICAL FIELD OF THE INVENTION

The technical field of this invention is complex integrated circuits including embedded digital processor cores and more particularly in circuit emulation of integrated circuits with embedded digital processor cores.

BACKGROUND OF THE INVENTION

Programmable digital processors such as microprocessors and digital signal processors have become very complex machines. Testing these programmable digital processors has also become complex task. It is now common for semiconductor manufactures to build single integrated circuit programmable digital processors with millions of transistors. The current trend is to devote many of these transistors to on-chip cache memories. Even so, the number of logic circuits and their complex relationships makes testing such integrated circuits an increasingly difficult task.

A trend in electronics makes this testing problem more difficult. Single integrated circuit programmable digital processors are becoming more and more of the electronics of many end products. A single integrated circuit used in this way typically includes a programmable digital processor, read only memory storing the base program, read/write memory for operation and a set of peripherals selected for the particular product. This trend is known as system level integration. In the ultimate system level integration, all the electronics are embodied in a single integrated circuit. This level of integration is now achieved in electronic calculators. Many electronic calculators consist of a single integrated circuit, a keyboard, a display, the battery or solar panel power source and a plastic case. Such integration provides less "visibility" into the operation of the programmable digital signal processor. Because the address and data busses of the digital processor are no longer brought out the device pins, it is more difficult to determine the behavior of the embedded processor from external connections.

Another trend in electronics makes this testing problem more difficult. Many new product applications require differing types of processing. Often control processes and user interface processes are better handled with a different programmable digital processor than digital signal processes. An example is wireless telephones. Many coding/decoding and filtering tasks are best handled by a digital signal processor (DSP). Other tasks such as dialing, controlling user inputs and outputs are best handled by microprocessors such as a RISC (Reduced Instruction Set Computer) processor. There is a trend for a system integrated circuit to include both a RISC processor and a DSP. These two processors will typically operate independently and employ differing instruction set architectures. Thus there may be more than one programmable digital processor on a single integrated circuit, each having limited visibility via the device pins.

Another problem is product emulation when employing these programmable digital processors. Product development and debugging is best handled with an emulation circuit closely corresponding to the actual integrated circuit to be employed in the final product. In circuit emulation (ICE) is in response to this need. An integrated circuit with ICE includes auxiliary circuits not needed in the operating product included solely to enhance emulation visibility. In the typical system level integration circuit, these emulation circuits use only a very small fraction of the number of transistors employed in operating circuits. Thus it is feasible to include ICE circuits in all integrated circuits manufactured. Since every integrated circuit can be used for emulation, inventory and manufacturing need not differ between a normal product and an emulation enhanced product.

As a result of these trends there is a need in the art for integrated circuits which are easier to test and easier to emulate.

SUMMARY OF THE INVENTION

This invention involves emulation communications via a test access port and boundary-scan architecture providing serial access to a serial connection of a plurality of registers disposed in a plurality of modules. One of the modules is selected for communication. Nonselected modules are made nonresponsive to data on the serial connection. The external emulation hardware supplies a serial signal having a first logic state for a number of cycles greater in number than a number of bits of the serial connection of registers to the test access port. The emulation hardware supplies a start bit having an opposite logic state. The selected module detects the start bit and stores the next predetermined number of data bits. These bits could be data bits to be stored in a program visible data register or bits interpreted as an instruction for execution by the module. The selected module may transmit return communications via the serial scan path using the same format.

BRIEF DESCRIPTION OF THE DRAWINGS

These and other aspects of this invention are illustrated in the drawings, in which:

FIG. 1 illustrates the environment of the debugging system of this invention which is known in the art;

FIG. 2 illustrates the known 14-pin JTAG header used to interface the target system to the access adapter;

FIG. 3 illustrates an emulation level view of the target system;

DETAILED DESCRIPTION OF PREFERRED EMBODIMENTS

Figure 4:
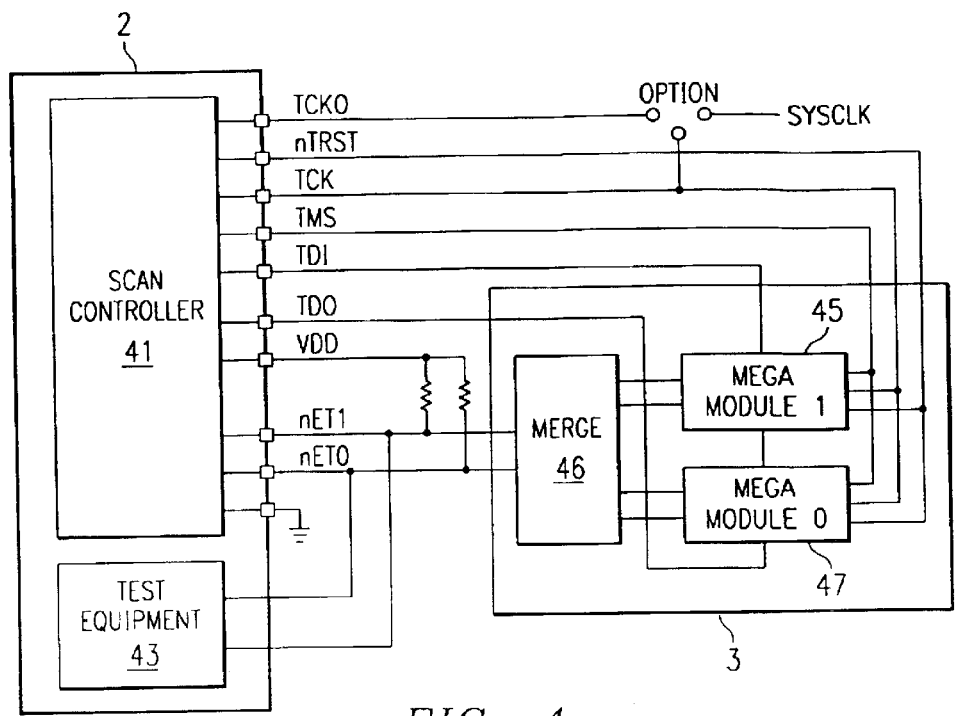
FIG. 4 illustrates an electrical connection view of the coupling between the access adapter and the target system.

FIG. 1 illustrates the environment of the debugging system of this invention. This environment connects high level debugging software executing on a debug host computer 1 to a low level debug interface supported by the target system 3. In this invention the target system 3 may include more than one programmable digital processor and possibly more than one such programmable digital processor on a single integrated circuit. In this application the term programmable digital processor is meant to encompass devices commonly known as microprocessors, microcontrollers and digital signal processors. The target system 3 provides a standard interface to the access adapter 2.

Debug host computer 1 consists of a computer, for example a PC, running a CPU core specific software debugger as one of its tasks. The debug host computer 1 allows the user to issue high level commands such as setting breakpoint, single stepping the programmable digital processor in target system 3 and displaying the contents of a memory range.

Access adapter 2 is a combination of hardware and software that connects the debug host computer 1 to target system 3. Access adapter 2 utilizes one or more hardware interfaces and/or protocols to convert messages created by user interface commands of debug host computer 1 into debug commands operable on target system 3. Access adapter 2 can be either loosely coupled or tightly coupled to the debug host computer 1. In the case of a PC host computer, access adapter 2 can be an XDS 510 scan controller attached directly to the PC bus. This implements a tightly coupled configuration requiring the PC to perform even the lowest level actions necessary to manage debug activity. In loosely coupled configurations, debug host computer 1 CPU communicates with another processor over a high bandwidth interface such as a SCSI, LAN or other interface. An example of this is a XDS 510WS controller connected to the target system debug interface and to the PC through a SCSI port. In this case access adapter 2 is a debug subsystem manager and handles the detailed manipulation of the target debug capability, and debug host computer 1 send high level commands to the debug subsystem. Access adapter 2 returns data and error conditions to debug host computer 1. Current PC operating systems may not be able to service the low level debug requirements continuously. Thus it may be advantageous to partition the problem into the display and user interface and control sections.

The target system 3 contains one or more programmable digital processor cores. The programmable digital processor core(s) contain hardware designed explicitly to ease debugging. This special hardware of target system 3 is the lowest element of the system debug environment 10. The programmable digital processor core debug facilities allow the user to control the program execution, examine or change system memory, core CPU resources in real-time.

The interface of access adapter 2 to target system 3 is preferably an extension to the IEEE 1149.1 (JTAG) test standard. The JTAG standard includes 5 primary signals known as nTRST, TCK, TMS, TDI, and TDO. The JTAG standard typically employs three additional signals Test Clock Out (TCKO), the target supply (Vdd) and ground (GND). The preferred embodiment of this invention also employs the two extension signals nET1 and nET0. Table 1 lists these signals, states whether the signal is an input, an output or both, and gives the descriptive name of the signal.

TABLE 1

| Pin | Type Input/Output | Description |
| --- | --- | --- |
| nTRST | I | Test Logic Reset Not |
| TCK | I | Test Clock |
| TMS | I | Test Mode Select |
| TDI | I | Test Data Input |
| TDO | O | Test Data Output |
| TCKO | O | Test Clock Out |
| PD (Vdd) | I | Target Power Supply |
| GND | I/O | Ground |
| nET1 | I/O | Emulation and Test 1 Not |
| nET0 | I/O | Emulation and Test 0 Not |

The signal nTRST is called Test Logic Reset Not. A low applied to this pin causes all test and debug logic in the target device to be reset along with the IEEE 1149.1 interface.

The signal TCK is called Test Clock. This signal is used to drive the IEEE 1149.1 state machine and logic. The same TCK supplied to the target device is supplied to this pin.

The signal TMS is called Test Mode Select. This signal directs the next state of the IEEE 1149.1 test access port state machine.

The signal TDI is called Test Data Input. This signal is the scan data input to the target device.

The signal TDO is called Test Data Output. This signal is the scan data output of the target device.

FIG. 2 illustrates a 14-pin JTAG header used to interface target system 3 to access adapter 2. The JTAG header requires three additional pins, and further includes two extension pins. The signal TCKO is called Test Clock Out. This signal is a test clock supplied by the scan controller to the target system. This test clock can be used as the system TCK source, or it can be ignored with the TCK source being generated by the target system. In many target systems, TCKO is simply connected to TCK and used as the test clock. The PD(Vdd) is called the Target Power Supply. This is used as a power detect input to access adapter 2. The JTAG header also includes ground connections.

The preferred embodiment of this invention includes an extension to the JTAG interface. Two pins nET0 and nET1 serve as a two pin trigger channel function. This function supplements the serial access capability of the standard interface with continuous monitoring of device activity. The two added pins create debug and test capabilities that cannot be created with the standard interface. The nET0 signal is called Emulation and Test 0 Not. This signal helps create a trigger to channel zero. Similarly, the nET1 signal is called Emulation and Test 1 Not. This signal helps create a trigger to channel one. These channels will be further explained below.

FIG. 3 illustrates an emulation level view of target system 3. Target system 3 may include plural devices 11, 13 and 15. FIG. 3 illustrates details of example device 13 which includes plural megamodules 21, 23 and 25. FIG. 3 illustrates details of example megamodule 23. Example megamodule 23 includes debug and test control unit 30 and plural device domains. These device domains include central processing unit (CPU) core 31, analysis unit 33, memory 35 and debug/test direct memory access (DT_DMA) unit 37.

Debug and test control unit 30 contains the IEEE interface. It provides a bridge between the Extended IEEE Interface and the debug and test capability distributed through the domains. Debug and test control unit 30 can independently control by the domains 31, 33, 35 and 37. In other words, one or more domains can be scanned or controlled while other domains continue operate in their normal functional way.

FIG. 4 illustrates an electrical connection view of the coupling between access adapter 2 and target system 3. FIG. 4 shows the connections of the of the various signals of the JTAG header 5 illustrated in FIG. 2. All these signals are connected to scan controller 41. The signals nTRST, TCK and TMS are connected to two example megamodules 45 and 47. FIG. 4 illustrates the optional connection of TCKO to the target system clock SYSCLK. The scan input TDI connects to a scan input of megamodule 45. The scan output of megamodule 45 supplies the scan input of megamodule 47. The scan output of megamodule 47 supplies the scan output TDO. The two extension signals nET0 and nET1 control megamodules 45 and 47 via merge unit 46. These extension signals are monitored by test equipment 43.

The debugging environment illustrated in FIGS. 1 to 4 permit the user to control application execution by any programmable digital processor of target system 3. Typical control processes include: keyboard directives such as run, halt and step; software breakpoints using op-code replacement; internal analysis breakpoints specified program counter or watchpoints specified by data accesses; and externally generated debug events.

Actions such as decoding a software breakpoint instruction (DSTOP), the occurrence of an analysis breakpoint or watchpoint (ASTOP), or the occurrence of a debug host computer event (HSTOP) are referred to as debug events. Debug events cause execution to suspend. Debug events tied to the execution of specific instructions are called breakpoints. Debug events generated by memory references are called watchpoints. External debug events can also suspend execution. Debug events cause entry into the Debug State.

Figure 5:
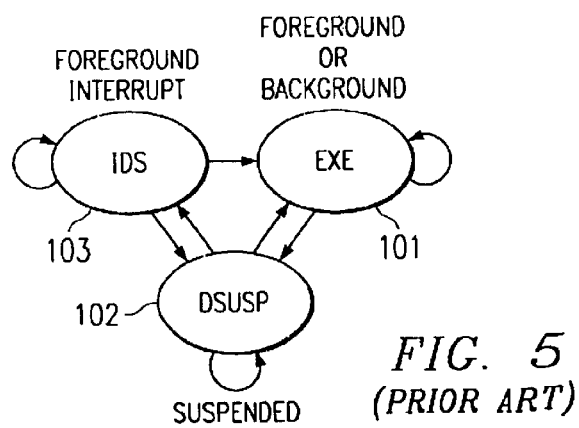
FIG. 5 illustrates the possible operation states in the debugging environment of the preferred embodiment of this invention.

FIG. 5 illustrates the possible operation states in the debugging environment of the preferred embodiment of this invention. These operation states are execute (EXE) 101, debug suspend (DSUSP) 102 and interrupt during debug suspend (IDS) 103.

Execute state 101 corresponds to the ordinary operation of target device 3. In the execute state 101 instructions are executed by the programmable digital processor in normal fashion. There are no outstanding debug suspend conditions. A low logic level applied to the nTRST terminal or a software directive requesting functional run forces the operational state to execute state 101. In execute state 101 the pipeline fetches and executes instructions and processes interrupts in a normal way.

The operational state transits from execute state 101 to debug suspend state 102 upon a debug event. The debugging environment of the preferred embodiment of this invention allows the suspension of program execution at points defined by breakpoint, watchpoints, and debug software directives, provided the application is an allowable debug suspend window. In general, debug events are allowed at an instruction boundary, when reset is inactive and no interrupts are active. Program execution suspends at an instruction boundary and the operational state changes to debug suspend state 102. When any debug condition is not met, the operational state remains in execute state 101 and no debug event processing occurs. The debugging environment permits debug event processing in the delayed slots of delayed branch instructions. Debug events occurring outside the debug suspend window create a debug pending condition. This condition suspends program execution when the application enables debug interrupts by opening the debug suspend window.

In the debug suspend state 102 background instruction execution is inactive. This state permits debug/emulation visibility into the state of target device 3 while background execution is suspended. In debug suspend state 102, the program counter (PC) and status bits are generally preserved at their values prior to the debug event. The PC points to the instruction to be executed next. When execution resumes, the instruction referenced by the PC and those following is fetched for execution. This is facilitated by flushing the front end of the pipeline upon entry into debug suspend state 102 from execute state 101.

The operational state may return to execute state 101 by a debug run directive. This may be either an unconditional run directive or a single step run directive. A single step run directive enters execute state 101 long enough to advance the instruction pipeline one stage and then returns to debug suspend state 102.

Certain interrupts transit the operation state from debug suspend state 102 to interrupt during suspend (IDS) state 103. These interrupts are defined by a separate interrupt mask independent of the normal interrupt mask. Those interrupts defined as high priority interrupts (HPI) or foreground interrupts cause the operation state to enter the interrupt during suspend state 103 from the debug suspend state 102. The debug suspend state 102 enables high priority interrupts independent of the state of the global interrupt enable bit or of software run directives. This enables debugging of background tasks while the target device 3 continues to service a real time application via high priority interrupts.

The interrupt pipeline jam for such a high priority interrupt moves the operational state to interrupt during suspend state 103. This jam causes an extra word to be pushed on the stack containing the debug status describing the reason the debug suspend state 102 entry occurred. Interrupt during suspend state 103 differs from the execute state 101 in that the interrupt processing creates a thread, linking the interrupt execution to the debug suspend state 102 as described in above. A digital frame counter (DFC) is incremented upon each high priority interrupt taken. The high priority interrupt sets an interrupt during debug state bit (IDS), which is part of the CPU status. The IDS bit sets after the context save stores the previous value on the stack with the status word. When returning from an interrupt the IDS bit indicates whether to re-enter debug suspend state 102. If the IDS bit is set, the interrupt occurred during a debug suspend state 102 and the operational state should return to the debug suspend state 102. If the IDS bit is not set, the interrupt occurred during the execute state 101 and the operational state should return to execute state 101. Upon returning from the interrupt, the PC and status return to their state before the interrupt unless the interrupt service routine has purposely modified values on the stack. This is required because it is possible for multiple interrupts to occur and be serviced while the device is in debug suspend state 102.

The digital frame counter is decremented upon each return from interrupt. This count permits the debug environment to track the status of the suspended foreground task. For example, a taken high priority interrupt may change the machine state and thus the current machine state would not reflect the suspended background task. However, if the digital frame counter were zero, then the debug environment is assured no interrupts have not temporarily changed the machine state.

The interrupt during suspend state 103 is exited at the end of the interrupt service routine. A normal end of an interrupt involves a return from interrupt instruction (RTI). Upon execution of a return from interrupt instruction, the machine status is popped from the stack. As noted above, the interrupt during debug state bit indicates whether the interrupt occurred during execute state 101 or debug suspend state 102. The operational state return to the former state as indicated by the interrupt during debug state bit. The prior value of the program counter is reloaded to recover the prior machine status. Execution of a return from interrupt instruction also decrements the digital frame counter. Because it is possible to receive a higher priority interrupt while servicing a prior interrupt, more than one interrupt level may be pending. The digital frame counter indicates the current interrupt level. This is useful to debug processing as the machine status may be changed by the multiple interrupts. The debug software can read the digital frame counter and supply a debug level identity to identify currently targeted interrupt level. Execution and register operations target a specific debug level. Memory operations can target a specific debug level or bypass the level comparison. In particular, the status of the background task suspended on initial entry into debug suspend state 102 can only be reliably determined if the digital frame counter is zero. The maximum number of levels of the digital frame counter corresponds to the size of the interrupt hierarchy. This data preserves a path back to the debug suspend state 102 when the application concludes the interrupt service routine with a return from interrupt instruction.

The interrupt during suspend state 103 transits to the execute state 102 upon execution of an abort interrupt (ABORTI) instruction. The abort interrupt instruction would ordinarily be used only on detection of a unrecoverable error in the interrupt service routine. The path back to the debug suspend state is broken upon execution of the abort interrupt instruction. The status of the interrupt during debug state bit and the digital frame counter are ignored in this case. In particular, the interrupt during debug state bit is cleared and the digital frame counter is set to zero. This mechanism enables recovery to the background task when a high priority interrupt service routine has an unrecoverable error.

Interrupts can be serviced the while the debug software views or modifies the CPU state. The debug state shown to the programmer reflects the machine state when there is no interrupt service routine active. The debug software works with on-chip debug support to ensure the high priority interrupts are transparent to a debug session. Likewise this hardware and software combination works to make debug activity transparent to high priority interrupt service routines. Note that program execution can actually be suspended in multiple locations if it is desired to break within a time critical interrupt while still allowing others to be serviced.

The alternative emulation data transfer protocol of the preferred embodiment of this invention cooperates with a serial scan test technique. The preferred embodiment of this serial scan technique is IEEE 1149.1 also know as JTAG described above.

The example system in FIG. 4 shows the system connectivity necessary for debug with one or more devices, one containing a programmable digital processor core. FIG. 4 omits signal buffering and other electrical considerations necessary to create a functional system. In this example, target device 3 contains two megamodules 45 and 47. Megamodule 45 includes a programmable digital processor core while megamodule 47 does not. The two devices share a parallel connection to signals nTRST, TCK, and TMS. The scan path begins as TDI at the connector, enters megamodule 45, exits megamodule 47, and ends as TDO back at the connector. Connections between merge unit 46 and pins nET1 and nET0 create trigger channels one and zero.

There is a problem using serial scan paths such as JTAG for transferring small amounts of data to or from a particular unit on an integrated circuit. This problem is the serial overhead. The serial scan model is best for loading or unloading all visible registers in the serial scan path. For test purposes this is a good system because the whole device can be placed in a known state relatively simply. In addition the whole device state can be read simply. In debugging it is often desirable to load or read the state of a single register or a small number or registers. In such a case the serial scan path requires more overhead than is necessary.

Figure 6:
FIG. 6 illustrates the typical scan-in data used to program an initial state of a complex integrated circuit in the prior art.

FIG. 6 illustrates the data needed to completely load a target device. A complete target device read uses this same data format. This data would typically include a prefix section 110 corresponding to registers within the serial scan path before the desired register. The data includes the data 111 corresponding to the desired register. Lastly, the data typically includes a suffix section 113 directed to data corresponding to registers following the desired register in the serial scan path. It can be quickly seen that for a single register read or write, most of the data transfer bandwidth is directed to transferring data not necessary for accessing the desired register. It is known to provide particular modules of the target device with a bypass capability. Using such a bypass capability causes the serial data stream to be diverted from the serial scan registers of that module and coupled directly from the module's serial data input to its serial data output. Even so, it is often the case for complex products that a minimum serial scan path including the desired register to include hundreds of times the number of bits as that of the desired register.

In addition to the bandwidth problem, data alignment is also a problem. Naturally any deviation in the serial data would result in an improper alignment in the data read from the target system or transmitted to the target system. Selectively using module bypasses exacerbates this problem by requiring careful attention to the current data path length.

Figure 7:
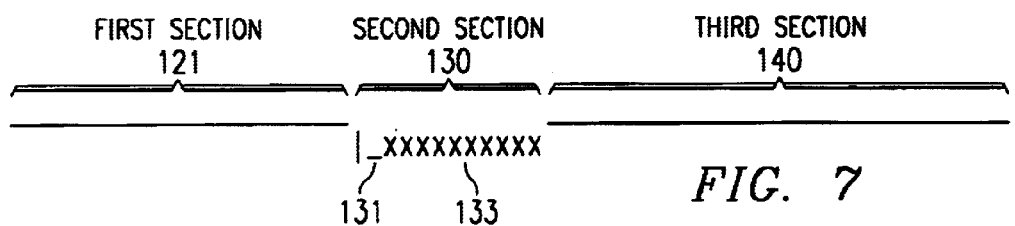
FIG. 7 illustrated the preferred embodiment of the alternate data transfer protocol of this invention.

This invention proposes employing another data transfer protocol on the serial scan path. FIG. 7 illustrates this alternate data transfer protocol. This data transfer protocol includes a first section 121 of plural bits of the same digital state. A second section 130 includes a start bit 131 of the opposite digital state and a predetermined number of data bits 133. Lastly, there is a third section 140 of the first digital state. In the preferred embodiment the first digital state is all 1's and the start bit is a 0. All the modules except the module including the desired register are made insensitive to the scan data stream. The selected module receives the data stream and searches for the start bit. Upon detection of the start bit, the predetermined number of bits is captured.

Figure 8:
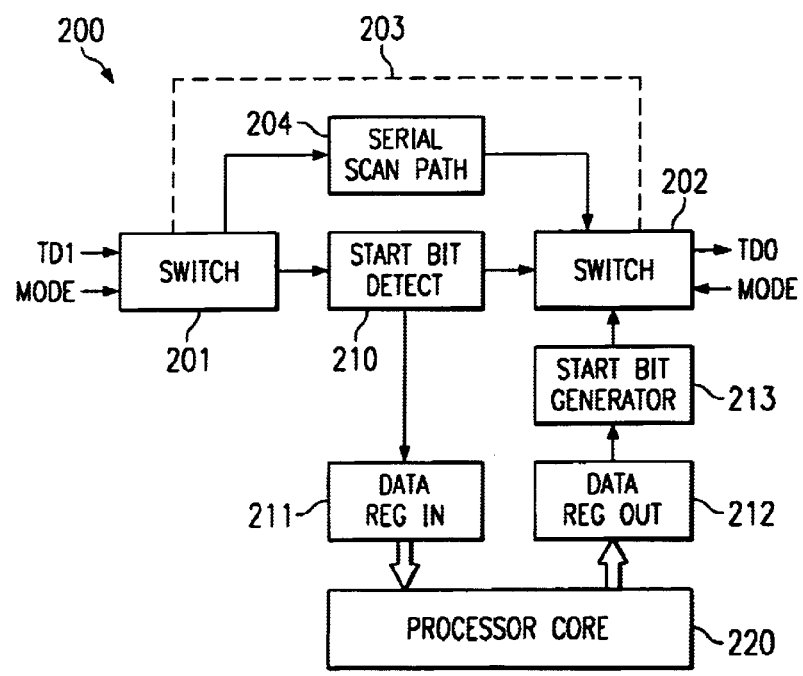
FIG. 8 illustrated in block diagram form protocol multiplexing hardware in accordance with this invention.

FIG. 8 illustrates in block diagram form hardware within each example module 200 utilizing the alternate data transfer protocol. The circuit receives a serial scan input on line TDI and produces a serial scan output on line TDO. Input switch 201 and output switch 202 route the input signal TDI to one of a plurality of paths according to a mode input. The first path is bypass path 203. This bypasses all circuits in the module. The second path is serial scan path 204. Serial scan path 204 is a serial connection of all registers visible via the serial scan path interface in the current module. The third path concerns the alternate data transfer protocol.

When selected as the output of input switch 201, start bit detect unit 210 searches for the start bit of the opposite digital state. If this start bit is not detected, then the data is coupled to one input of output switch 202. If this start bit is detected, then the next predetermined number of bits is transferred to data register IN 211. Data register IN 211 is visible to the programmable digital processor core 220.

Example module 200 illustrated in FIG. 8 may also transit data via this alternate data transfer protocol. Programmable digital processor core 220 loads the data to be transmitted to data register OUT 212. Programmable digital processor core 220 then triggers start bit generator 213 and selects data transmission mode at output switch 202. Start bit generator 213 produces the start bit which is selected for transmission to the TDO line by output switch 202. Output switch 202 then selects data register OUT 212 for serial transmission of the predetermined number of bits. This scheme is similar to that of a universal asynchronous receiver/transmitter (UART) with start bits and fixed length data. Note that the data transmitted to module may be data to be loaded into selected locations within the module or it may be instructions for execution by programmable digital processor core 220.

What is claimed is:

1. A method for emulation communications via a test data input port and boundary-scan architecture providing serial access to a serial connection of a plurality of registers disposed in a plurality of modules, each of the plurality of modules including at least one of the plurality of registers, comprising the steps of:

selecting for communication one of said plurality of modules, nonselected modules being nonresponsive to data on said serial connection;

supplying to the test data input port for communication to the boundary-scan architecture a serial signal having a number of bits greater in number than a number of bits of the serial connection of the plurality of registers, each bit of said serial signal having a first digital state;

following supply of said serial signal, supplying to the test data input port for communication to the boundary-scan architecture a single start bit having a second digital state opposite to said first digital state followed by a predetermined number of data bits;

at said selected module detecting said single start bit within the boundary-scan architecture and storing said predetermined number of data bits.

2. The method of claim 1, wherein:

said step of storing said predetermined number of data bits consists of storing said predetermined number of data bits in a program visible data register.

3. The method of claim 1, further comprising:

at said selected module, interpreting said predetermined number of data bits as an instruction and performing a function corresponding to said instruction.

4. The method of claim 1, wherein the boundary-scan architecture includes a test data output port following a last of the serial connection of registers, the method further comprising:

at said selected module, identifying a predetermined number of data bits to be transmitted, supplying to following registers in the serial connection of the plurality of registers a single start bit having a second digital state opposite to said first digital state followed by said identified predetermined number of data bits to be transmitted.

5. The method of claim 1, wherein:

said first digital state is 1; and said second digital state is 0.

6. A digital electronic module comprising:

a serial scan path having a serial input and a serial output and connecting through a plurality of data registers within the digital electronic module;

a start bit detector having a start bit detector input, a start bit detector output and an alternative data output, said start bit detector monitoring serial data received at said start bit detector input and coupling serial data received at said start bit detector input to said start bit detector output except upon detection of a number of serial, bits having a first digital state followed by a single start bit having a second digital state opposite to said first digital state coupling a second predetermined number of bits of serial data received at said start bit detector input to said alternative data output;

an alternative data input register connected to said alternative data output of said start bit detector for receiving and storing data output by said start bit detector on said alternative data output;

an input switch having a serial test data input and a first mode input, said input switch connecting said serial test data input to said serial input of said serial scan path upon receiving a serial scan path mode signal at said first mode input and connecting said serial test data input to said start bit detector input of said start bit detector upon receiving an alternate data transfer protocol mode signal at said first mode input; and an output switch having a test data output and a second mode input, said output switch connecting said serial output of said serial scan path to said test data output upon receiving said serial scan path mode signal on said second mode input and connecting said start bit detector output of said start bit detector to said test data output upon receiving said alternate data transfer protocol mode signal at said second mode input.

7. The digital electronic module of claim 6, wherein:

said first digital state is 1; and said second digital state is 0.

8. The digital electronic module of claim 6, further comprising:

a bypass path connecting said input switch and said output switch;

said input switch further connecting said serial test data input to said bypass path upon receiving a bypass path mode signal at said first mode input; and said output switch further connecting said bypass path to said test data output upon receiving said bypass path mode signal at said second mode input.

9. The digital electronic module of claim 6, further comprising:

a digital circuit connected to said alternative data input register operable to employ data stored in said alternative data input register.

10. The digital electronic module of claim 9, wherein:

said digital circuit includes a programmable digital processor core.

11. The digital electronic module of claim 10, wherein:

said programmable digital processor core employs data stored in said alternative data input register as an instruction controlling execution by said programmable digital processor core.

12. The digital electronic module of claim 9, further comprising:

an alternative data output register connected to said digital circuit storing data specified by said digital circuit;

a start bit generator connected to said alternative data output register and said output switch, said start bit generator generating a start bit having said second digital state followed by a a predetermined number of bits of output data stored in said alternative data output register; and said output switch further connecting said start bit and said predetermined number of bits of output data stored in said alternative data output register to said test data output upon receiving a data transmission mode signal at said second mode input.

* * * * *